(12) United States Patent
Fischer et al.

(10) Patent No.: US 7,313,601 B2
(45) Date of Patent: Dec. 25, 2007

(54) ADAPTIVE CONTROL SYSTEM AND METHOD FOR OPTIMIZED INVOCATION OF PORTLETS

(75) Inventors: Peter Fischer, Kronach (DE); Stephan Hesmer, Holzgerlingen (DE); Thomas Schaeck, Achern (DE); Brad Byer Topol, Raleigh, NC (US); Dirk Koehler, Altenburg (DE); Gerhard Stark, Althengstett (DE)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 10/351,558

(22) Filed: Jan. 23, 2003

(65) Prior Publication Data
US 2003/0188163 A1    Oct. 2, 2003

(30) Foreign Application Priority Data
Mar. 28, 2002   (EP) ................................. 02007110

(51) Int. Cl.
*G06F 15/16*    (2006.01)
(52) U.S. Cl. ..................... 709/217; 718/100
(58) Field of Classification Search .............. 709/201, 709/226, 229, 217, 246, 205; 718/100, 104, 718/106, 107; 707/E17.111
See application file for complete search history.

(56) References Cited

U.S. PATENT DOCUMENTS

| | | | |
|---|---|---|---|
| 6,918,090 B2 * | 7/2005 | Hesmer et al. | 715/760 |
| 2002/0169852 A1 * | 11/2002 | Schaeck | 709/218 |
| 2003/0163513 A1 * | 8/2003 | Schaeck et al. | 709/201 |
| 2005/0187978 A1 * | 8/2005 | Qian et al. | 707/104.1 |
| 2006/0036682 A1 * | 2/2006 | Fletcher et al. | 709/203 |
| 2006/0129825 A1 * | 6/2006 | Salomon et al. | 713/176 |
| 2006/0195816 A1 * | 8/2006 | Grandcolas et al. | 717/101 |

\* cited by examiner

*Primary Examiner*—Abdullahi Salad
(74) *Attorney, Agent, or Firm*—Mark S. Walker; Gregory K. Goshorn; Greg Goshorn, P.C.

(57) ABSTRACT

The present invention describes an adaptive control system being preferably part of the portal, which provides a sophisticated method for a partial sequential and parallel invocation of portlets depending on the available resources and system utilization. Based on defined time mark for rendering content (maximum invocation time for displaying a portal page or a portal-wide portlets rending time mark), a number of available threads, and estimated invocation time for each portlet the inventive method determines and invokes a first group of portlets (80,90) providing the maximum number of portlets to be invoked sequentially without exceeding defined time mark for rending content, and then all remaining portlets (80,90) are to be invoked parallel to that first group of portlets. The invention guarantees reasonable response times and high scalability and performance. (FIG. 9).

21 Claims, 7 Drawing Sheets

ADAPTIVE CONTROL SYSTEM AND METHOD FOR OPTIMIZED INVOCATION OF PORTLETS

The present invention relates to a Portal using portlets and in particular how invocation of portlets accessing remote content can be optimized with a minimum delay.

Portals are becoming the focal points for users to access information (content) and applications from many different sources. Typically, Portals get information from local or remote data sources, e.g. from databases, transaction systems, syndicated Content-Providers, or remote Web Sites, and render and aggregate this information into complex pages to provide information to users in a condensed form. In addition to pure information, many Portals also include applications like e-mails, calendar, organizers, banking, bill presentment, etc. A well-known example is the Yahoo! Portal that provides access to a large amount of content and applications.

Figure 1:
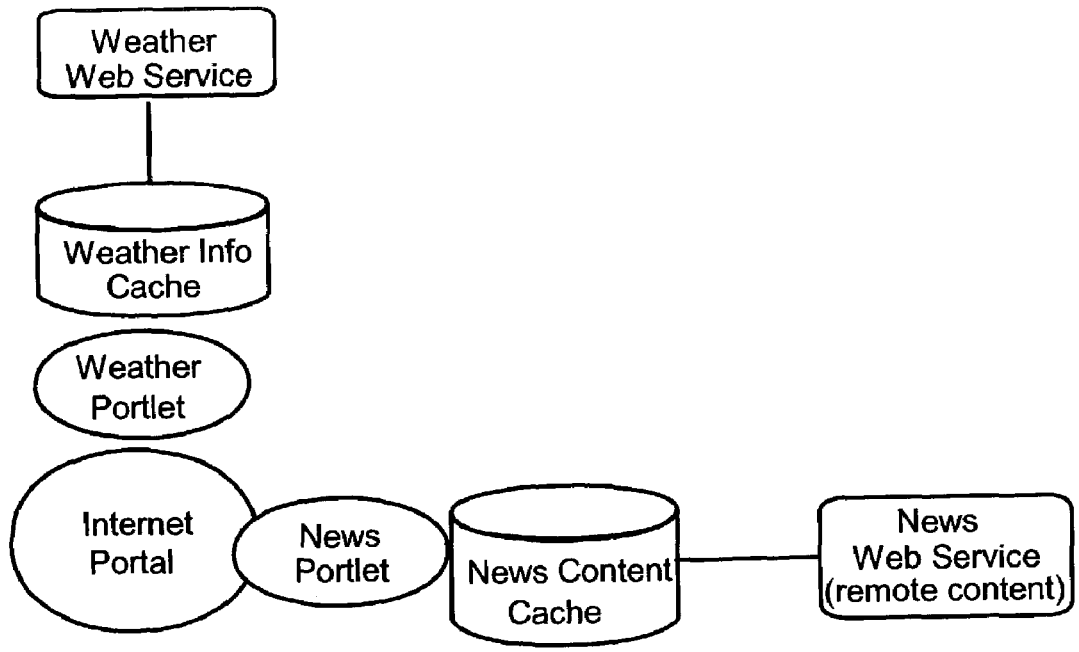

Different rendering and selection mechanisms are required for different kinds of information or applications, but all of them rely on the portal's infrastructure and operate on data or resources that are owned by the portal, e.g. user profile information, persistent storage or access to managed content. Consequently, most of today's Portal implementations provide a component model, where pluggable portal components modules referred to as Portals can be added to the portal infrastructure. Portlets are pluggable components that can be added to Portals and are designed to run inside a portal's portlet container, which provides a common interface to all executable portals. Portlets may provide different functions ranging from simple rendering of static or dynamic content to application functions such as e-mail, calendar, etc. Portlets are invoked indirectly via the portal application and produce content that is suited for aggregation in larger pages, e.g. portlets should produce mark-up fragments adhering guidelines that assure that the content generated by different portlets can be aggregated into one page. Typically, portlets run on the Portal-Server, processing input data and rendering content locally. Often, the content for portlets that are displayed very often is cached locally to improve response times, performance and scalability of portals. FIG. 1 shows a weather portlet and a news portlet running on an Internet-Portal. The Portal uses databases to cache weather info and news content locally so that the portlets can display them without delay.

DESCRIPTION

While local portlets typically provide short response times, this approach is not well suited to enable dynamic integration of business applications and information sources into Portals. More and more local portlets running in a Portal environment are using Web-Services provided by Web-Service-Provider. Web-Services may be defined as providing existing or new software components into a service-oriented architecture (SOA). Example of such services may be explained by FIG. 2 which covers the following scenario: An employee Portal manager wants to include a human resources service (HR Web-Services) that can calculate the variable pay for employees and an external weather (Web-Service that provides weather forecasts for given cities. Human resources (HR Portlet) and a weather portlet run locally on the portal server.

The HR portlet user a HR Web-Service to calculate the variable pay. A possible implementation is a portlet that be default displays a form to query the required parameters, e.g. the position and last grade of an employee. When the employee enters his data at the HR portlet, it invokes the remote Web-Service to calculate the variable pay based on that data. It receives the result from the Web-Service and displays it as a page fragment.

The weather portlet by default displays weather forecasts for configurable locations. It allows the user to select locations through an edit mode. Whenever the Portal displays it, the weather portlet gets the most recent forecasts for the selected locations and renders a page fragment that displays them. To support that HR Web-Service in the Internet, a new architecture was defined, SOA, the Service Oriented Architecture. This new architecture describes how a Web-Service may be found by a user, how a potential user can access such Web-Services, and a language describing the Web-Service.

The communication protocol for these Web-Services is also a new defined protocol, called SOAP that stands for Simple Object Access Protocol.

SOAP is a way for a program running in one kind of operating system to communicate with a program in the same or another kind of an operating system by using preferably the world Wide Web's Hypertext Transfer Protocol (HTTP) and its Extensible Markup Language (XML) as the mechanisms for information exchange. Since web protocols are installed and available for use by all major operating system platforms, HTTP and XML provide an already at-hand solution to the problem of how programs running under different operating systems in a network can communicate with each other. SOAP specifies exactly how to encode an HTTP-header and an XML-file so that a program in one computer can call a program in another computer and pass it information. It also specifies how the called program can return a response.

Figure 3:
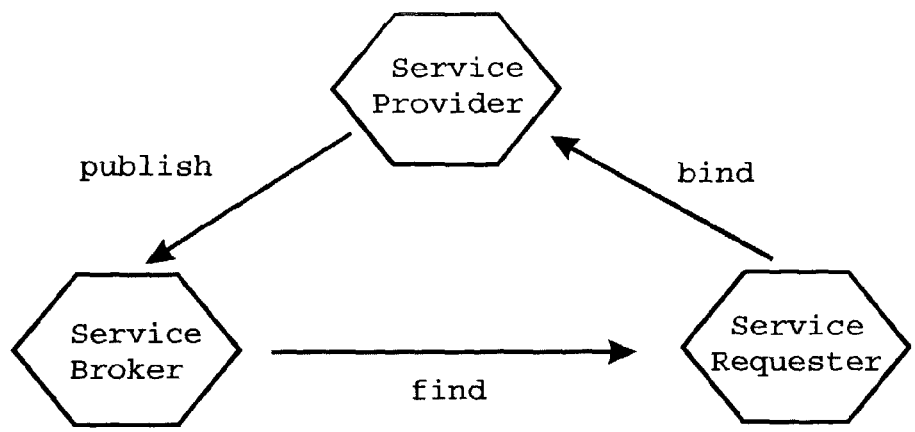

The basic architecture of SOAP is shown in FIG. 3. The basic architecture comprises three components, the Service-Providers, the Service-Brokers, and the Service requesters.

The Service-Providers publish the availability of their Web-Services, the Service-Brokers register and categorize the published Web-Services and provide search services, and the Service-Requesters using Service-Broker to find a needed Web-Service and then employing that Web-Service.

Figure 4:
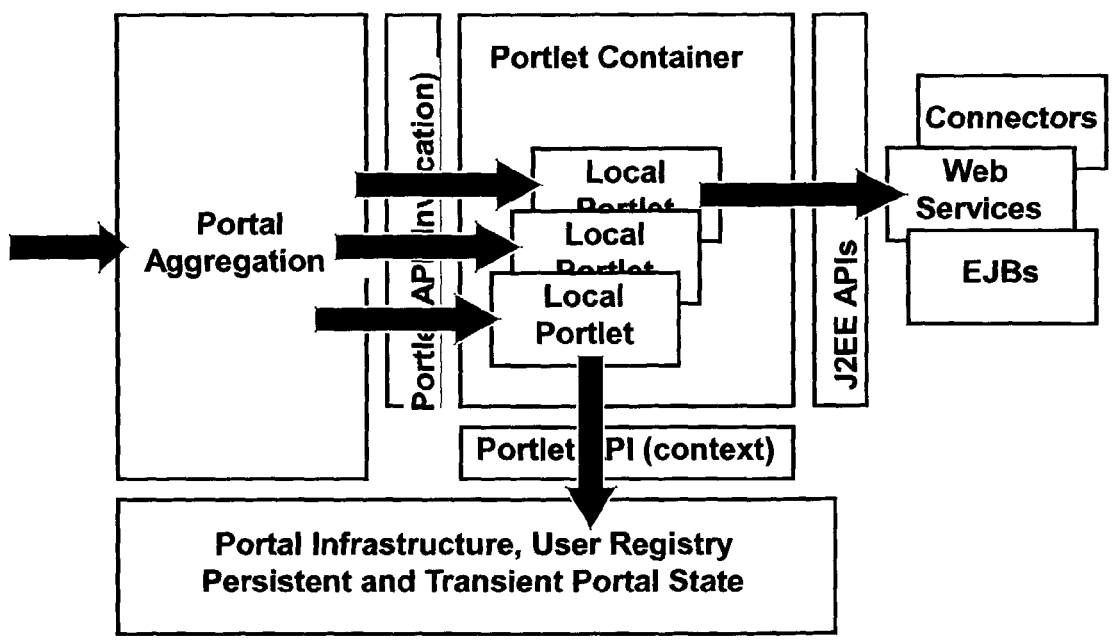

An example of a prior art implementation of a portal accessing to local portlets as well as remote portlets being provided as a Web-Service is shown in FIG. 4.

The relevant part of the portal addressed by the present invention is the aggregation component. The aggregation component finds out which portlets in which order will be displayed on the requested page. Then the aggregation component must call each single portlet to produce its specific markup content. All portlets are invoked by the aggregation component via the portlet container, which provides a common interface to all executable portlets, e.g. portlets accessing remote content (Web-Services).

There exist several portlet containers in the market, which uses either pure sequential or pure parallel invocation of portlets. Sequential invocation means that a request for markup is sent to one portlet. This portlet then gets the required information, e.g. from backend systems or content providers, processes the information and returns the result to the aggregation component. Then the aggregate component invokes the next portlet and so on. This means that for sequential invocation the invocation times are added and therefore can add up to an unacceptable delay (t page=sum (t portlets)). Especially when portlets are to be displayed that need and process remote content (Web-Services) a significant per-portlet delay is given. The advantage of sequential invocation would be minimal administrative overhead for the system, as it only has to process one portlet at one time.

Figure 5A:
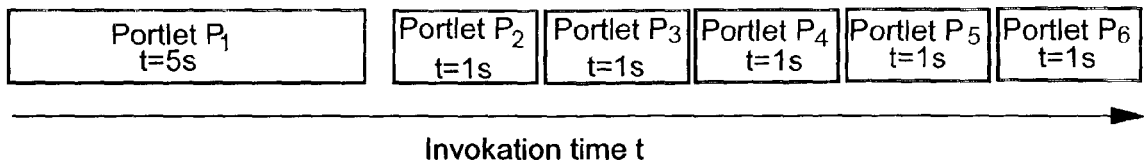

FIG. 5A shows a sequential invocation of 6 portlets. The overall invocation time for all portlets amounts 10 seconds. This clearly shows that such a long invocation time for one page is unacceptable for users.

Parallel invocation requires multi threading, where a thread is lightweight process or sub-process, which can be started within an existing process and runs parallel to the main process and other threads. Parallel invocation of portlets means that the aggregation component sends out requests successively without waiting for the result of the portlets.

Therefore, for each portlet a threat is being started then sends the request to the portlet. The results of the portlets are then collected and the page can be displayed as soon as the slowest portlet returns its markup. In summary the time for rendering the page is about the time consumed by the slowest portlet (t page=max (t portlet)<sum (t portlets)).

Figure 5B:
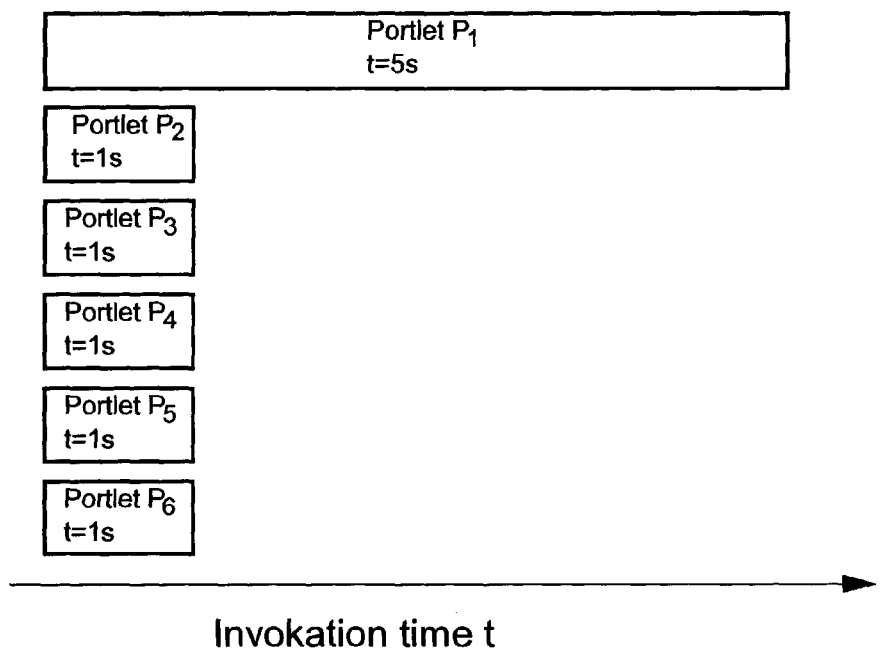

FIG. 5 B shows a parallel invocation of 6 portlets. The overall invocation time for all portlets amounts 5 seconds. Compared with sequential invocation this seems to be very fast. However a disadvantage of parallel invocation is that the number of required threads may become excessively high. The consequence is that the performance of the microprocessor will decrease and concurrently the time for displaying a page will increase or in the worst case will be interrupted.

U.S. Pat. No. 20,019,016 describes a computer-based presentation manager and method for individual user-device data representation. Access to external service providers is provided through portlets, where each portlet accessible by user is represented on the display on the user device. Through the use of a dynamic content channel, e.g., a portlet, a highly customizable content page may be produced for any individual client systems. When a portlet is selected on a user device, the content associated with the portlet is retrieved and automatically transformed into the data that can be displayed by that user device. An individual user can personalize the user device by specifying which service providers from among the ones the organization has made available via portlets, the user wants to use. That patent does not address the problem how portlets are to be invoked.

Therefore, it is object of the present invention to provide a system and method for optimized invocation of portlets combining the advantage of the existing invocation methods but avoiding their disadvantages.

This object is solved by the features of the independent claims.

Further preferred embodiments are laid down in the dependent claims.

The present invention provides an adaptive control system being preferably part of the portal and a method thereof which provides a sophisticated method for a partial sequential and parallel invocation of portlets depending on the available resources and system utilization. Based on defined time mark for rendering content, a number of available threads, and estimated invocation time for each portlet the inventive method determines and invokes a first group of portlets (80,90) providing the maximum number of portlets to be invoked sequentially without exceeding defined time mark for rendering content (maximum invocation time for displaying a portal page or a portal-wide portlet rendering time mark), and then all remaining portlets (80,90) are to be invoked parallel to that first group of portlets. The invention guarantees reasonable response times and high scalability and performance.

Figure 2:
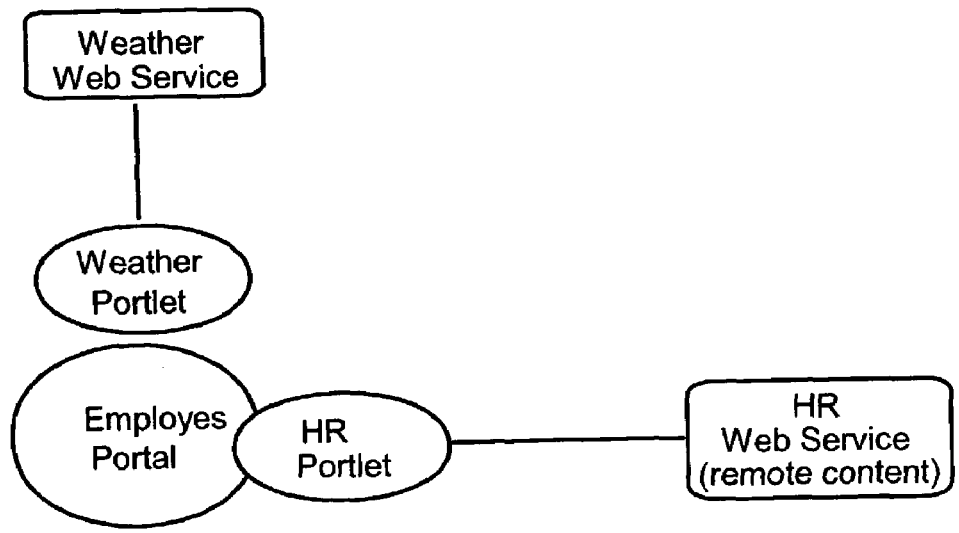
Figure 7:
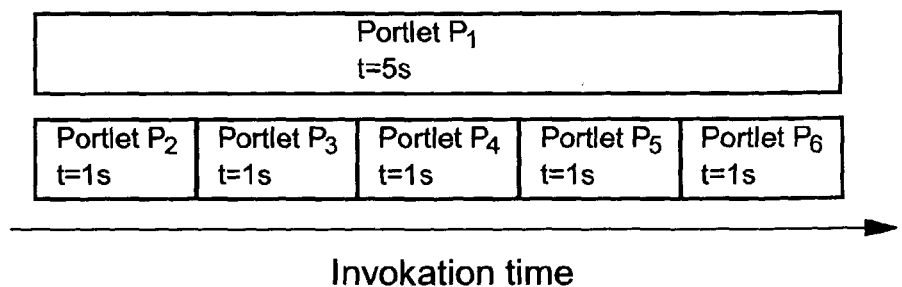
Figure 6:
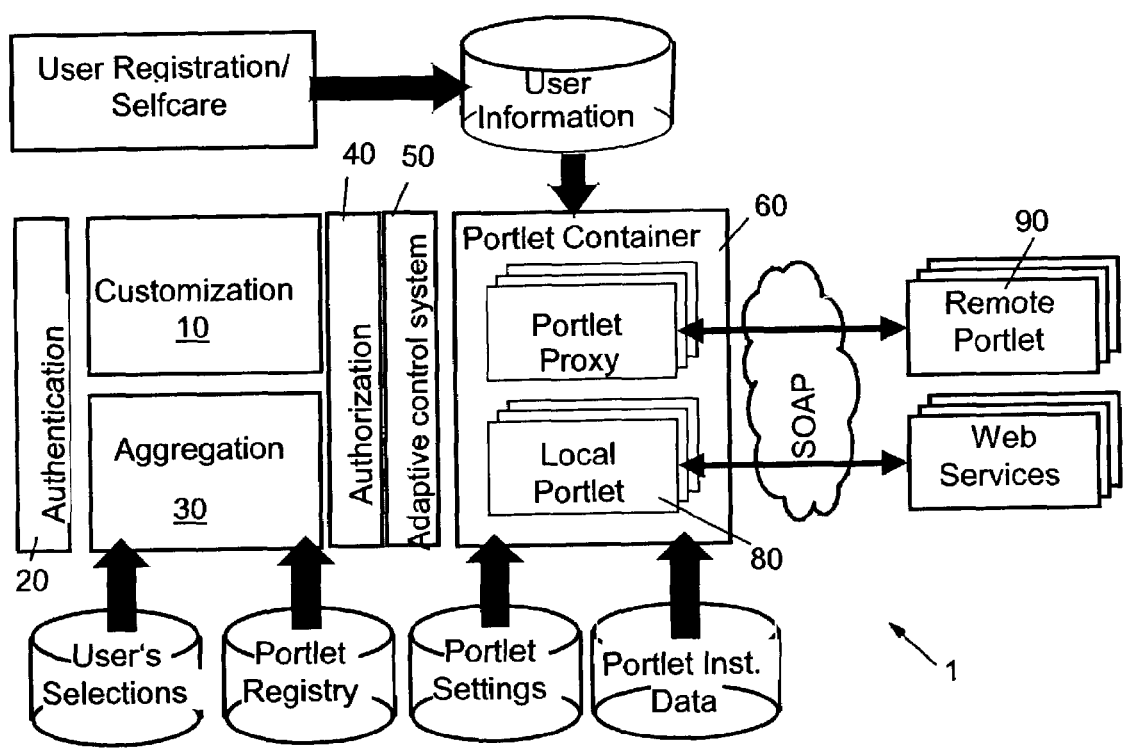
Figure 8A:
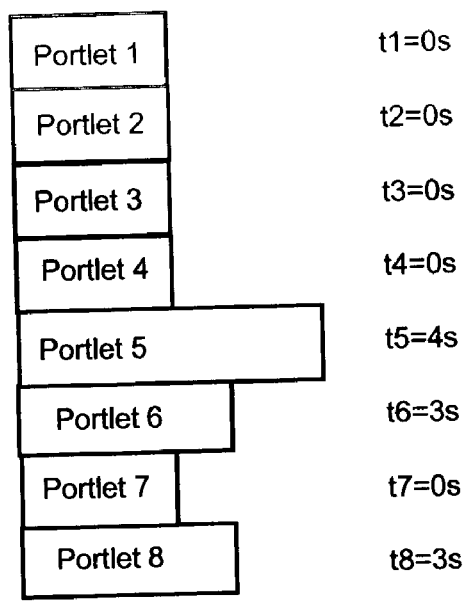
Figure 8B:
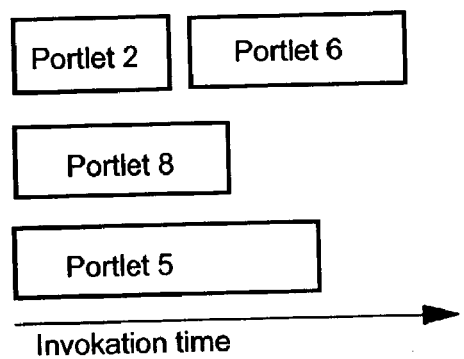
Figure 8C:
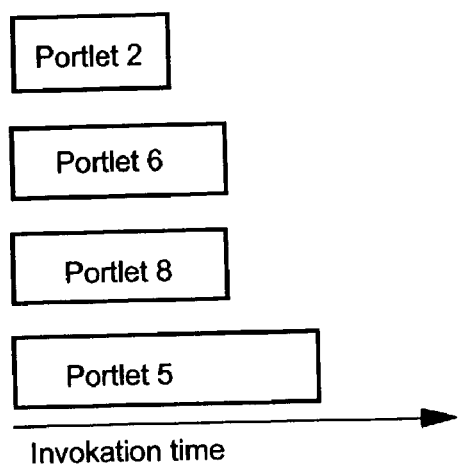
Figure 9:
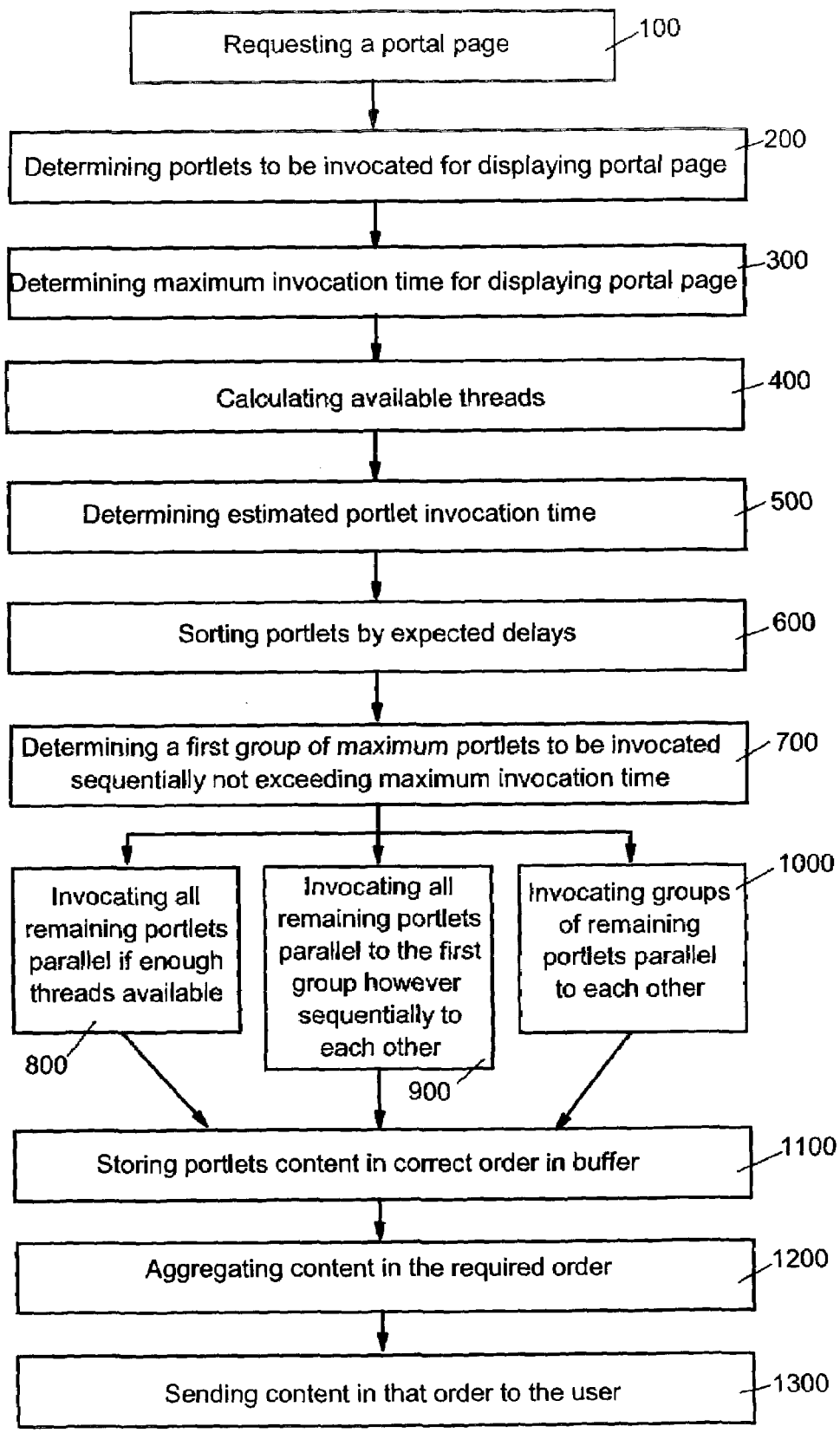

The present invention will be described in more detail with the accompanying drawings in which FIG. 1 shows a prior art Portal using local portlets, FIG. 2 shows a prior art local portlet using a Web-Service, FIG. 3 shows the basic structure of a SOAP-Web-Service architecture;

FIG. 4 shows the structure of a prior Portal on which the present invention is based, FIGS. 5 A/B shows an example of sequential and parallel invocation of portlets as applied by prior art Portal in FIG. 4, FIG. 6 shows the structure of the Portal with the inventive adaptive control system, FIG. 7 shows a flow-chart with the inventive method steps according to the present invention, FIGS. 8 A/B/C shows a first and second test scenario of the present invention, FIG. 9 shows a flow-chart with the inventive method steps of the present invention, and FIGS. 10 A/B shows a preferred embodiment of the thread pool implementation as used by the present invention.

A typical Portal (1) as used by the present invention preferably comprises an authentication component (20) for giving access to the portal (1), a customization component (10) allowing user configuration of the portal, an aggregation component (3) which finds out which portlet n which order should be displayed on the requested user page, an authorization component (40) for providing access only to those portlets (80, 90) for which the user is registered, and a portlet container component (60) which provides a common interface to all executable portlets stored locally (80) or remotely (90). The new and inventive adaptive control system (50) which may be part of the aggregation component (30) or the portlet container (60) provides a method for partial sequential and parallel invocation of portlets (80,90) depending on the available resources and system utilization (see FIG. 6). Based on defined time mark for rendering content, a number of available threads, and estimated invocation time for each portlet the inventive method determines and invokes a first group of portlets (80,90) providing the maximum number of portlets to be invoked sequentially without exceeding defined time mark for rendering content (maximum invocation time for displaying a portal page or a portal-wide portlet rending time mark), and then all remaining portlets (80,90) are to be invoked parallel to that first group of portlets. In a further embodiment of the present invention the method determines a first group of the maximum number of the fastest portlets (80,90) to be invoked sequentially without exceeding the defined time mark for rendering content, and then determines a second group of portlets (80,901 to invoked sequentially without exceeding that time mark for rendering content which is being invoked parallel to first group, and repeats that determination step as long as threads available otherwise all remaining portlets (80,901 are to be invoked sequentially.

An example of specific implementation of the working process of the adaptive control system will be described in connection with FIG. 7. In the first step the aggregation component finds out which portlets have to be invoked in order to display a requested page and sends requests for invocation of portlets to the adaptive control system. In our example in FIG. 7 portlets P1-P6 have to be invoked in order to display a page. One of the portlets (P1) takes 5 seconds to render its content and each of the remaining portlets requires 1 second. In summary the shortest possible time to display a page would be 5 seconds.

That means that portlet P1 defines the first group of portlets to be invoked, and all remaining portlets (P2-P6) are to be invoked parallel to the first group. When enough threads are available each portlet of the remaining portlets P2-P6 is invoked parallel to each other with its own thread. In the case no further threads are available all remaining portlets are to be invoked sequentially by only one thread. Which specific invocation method will be finally used depends on the system utilization which may be checked steadily by the inventive method. In the example of FIG. 7 the remaining portlets 8 und 5 are to be invoked parallel to portlet P1 however in a sequential order.

Looking at he given example the distribution of portlets to be invoked sequentially or parallel is very easy. However in more realistic and more complex scenarios in which 1000 and more portlets are invoked a sophisticated algorithm or method is required.

A PREFERRED METHOD FOR CARRYING OUT THE INVENTION

In this method the time mark for rending content is the maximum invocation time, e.g. as a configuration parameter of the portal or as the longest response time of a portlet. Then a group of portlets whose invocation time does not exceed the maximum invocation time as being invoked sequentially all remaining portlets are being invoked in parallel by an own threads except no further threads are available. In the case no further threads are available all remaining portlets will be invoked sequentially.

A desired maximum invocation time $t_{max}$ is specified for pages.

Portlets (P) that access remote content having portlet configuration parameter which indicates a delay set by the programmer or administrator. There are two alternatives for configuration of the delay. In the first alternative the delay is set by a Boolean value (true/false). If "true" is given the method automatically sets a default time which will be corrected after the first invocation. The second alternative indicates an average delay time. This average delay time will be also corrected with each invocation.

Starting with the value given in the portlet configuration, the adapting control system computes the estimated response time for each portlet by means of following formula:

$$t_{estimatedn+1} \approx (1-a)t_{n-1} + at_n,$$

where a is a contant which indicates how strong the time adapts to the time of the latest invocation, for the first invocation tn-1 is the value given in the portlet configuration which will be adapted after each invocation of that portlet.

This leads to the following formula to compute, the estimated response time for the next invocation after several invocations:

$$t_{estimatedn+1} \approx \text{sum}[i=1 \ldots n] ((1-a)n-i\ t_i) + a\ t_n, \text{ n is the number of the invocation of the portlet}$$

The adaptive control system estimates the response time for each individual portlet.

Then the adaptive control system sorts the portlets with delays to render on a page by estimated delays for getting remote data, $[P_1, P_2, \ldots, P_m]$.

The adaptive control system determines how many portlets k can be invoked sequentially without exceeding the maximum invocation time $t_{max}$;

$$\text{sum}[i=1 \ldots k]\ (t_i) < t_{max}$$

leaving more portlets for parallel invocation than threads (1) are available this leads to:

$$h = \max(k, m-1)$$

m is the number of portlets to be invoked
l is the maximum number of threads within a thread pool
k is the number of fastest portlets to be invoked sequentially without exceeding $t_{max}$ So the portlets $P_i, \ldots P_h$ are invoked using the "application thread" and the portlets $P_{h+1}, \ldots, P_m$ using "dedicated threads" from a thread pool. The term thread used in the present invention may be defined as a light-weight or sub-process that is executed and administrated parallel to application process by the system's processor. The thread is initiated by the application and the maximum number of threads within a thread pool is limited by the system configuration, e.g. memory, processing power. In summary, the size of thread pool must be restricted accordingly.

The number of portlets which can be handled by the application thread while staying below $t_{max}$ is determined. Then for each of the remaining portlets a further portlet thread from the thread pool is allocated. If there are no further threads available from the thread pool then the application process also handles the rendering of any remaining portlets which means that all remaining portlets will be invoked sequentially.

The above explained inventive method will be explained by a means of a first and second scenario with 8 portlets (see FIGS. 8 A, B, C).

Scenario 1 (FIGS. 8A/B).

The aggregation component sends a request to the adaptive control system to invoke 8 portlets P1-P8 (FIG. 8 A). The adaptive control system determines the maximum invocation time ($t_{max}$) for displaying a page, and the available number of threads (maximum threads of the thread pool—working threads). In the present scenario $t_{max}$=(6s, and the threads =5. Then the estimated response time for each portlet to be invoked is determined. Portlets that render remote content and thus indicate their expected delay in their configuration data. Starting with the expected delay value, the adaptive control system computes the estimated response time by means of following formula:

$$t_{estimatedn+1} \approx (1-a)t_{descriptor} + a\ t_n.$$

The estimated response time for each portlet is given as follows:

p1=0 sec, p2=2 sec, P3=O sec, P4=O sec, P5=4 sec, P6=3 sec, P7=0 sec, P8=3 sec

Then the portlets are sorted by their estimated delays as follows:

$P_1[0s], P_3[0s], P_7[0s], P_2[2s], P_6[3s], P_8[3s], P_5[4s]$ k=6 that means that 6 fasted portlets can be rendered sequentially and still be faster then $t_{max}$ (0s+0s+0s+0s+2s+3s=5s<6s)

h=max (k, m−1)=max(6, 8−5)=6 that means that the 6 fastest portlets must be invocated sequentially which means that the maximum number of threads within the thread pool is sufficient to invocate all other portlets by an own thread.

The adaptive control system invokes portlets 5 and 8 using dedicated portlet threads, the portlets 1,3,4,7,2,6 are rendered using the application thread (FIG. 8 B).

The estimated time to render the whole page is 5 seconds.

SCENARIO 2 (FIG. 8C)

$t_{max}$2s, available thread 1=5;

Portlets sorted by estimated delays:

$P_1[0s], P_30s], P_4[0s], P_7]0s], P_2[2s], P_6[3s], P_83s], P_5[4s]$ k=5 h=max (k, m−1)=max (5, 8−5)=5

The adaptive control system renders portlets 5, 6 and 8 using dedicated portlet threads, the portlets 1,3,4,7,2 are rendered using the application thread (FIG. 8 C).

The estimated time to render the page is 4 s.

FIG. 9 shows the basic method for invocation of portlets carried out by the adaptive control system with its implementation alternatives.

The Portal runs as application in the Application Server (AS), which is preferably an Application Server—Java Virtual Machine (AS-JVM). The AS-JVM provides a thread pool to handle incoming user requests in parallel. The AS-thread pool determines the number of user requests which can be processed in parallel. When the number of requests (e.g. HTTP-requests) exceeds a certain given number all incoming request are to be processed in a sequential order. After user authentication and user authorization the aggregation component being part of the portal determines portlets to be invoked in order to display that requested pages and provides those portlet invocation requests to the adaptive control system (100, 200). Then, the adaptive control system calculates the estimated invocation time for each portlet (500) based on the last invocation time of the portlet if available. Then the system accesses the time mark for rendering content for displaying a page (300), which is the maximum invocation time for displaying a user requested portal page. The maximum invocation time may be configured by the administrator of the portal or will be determined during the invocation process itself, e.g. using the longest response time of a portlet as maximum invocation time. Then, the number of available threads has to be determined (400). All portlets are to be sorted according their estimated response time (600). The system selects a first group of maximum portlets to be invoked sequentially preferably using the fastest portlets at first (700). The sum of their invocation time may not be bigger than the maximum invocation time. The invocation is performed sequentially by one thread, e.g. application thread. The selection step is repeated for the remaining portlets till all portlets are invoked. There are following alternatives for invocation of the remaining portlets:

all remaining portlets are to be invoked parallel to the first group of portlets. The implementation requires that each portlet gets its own thread. This implementation may only be used when enough threads are available (800), all remaining portlets are to be invoked parallel to first group of portlets however all remaining portlets are invoked sequentially to each other. That implementation requires that the sum of invocation time of the remaining portlets may not be greater than the maximum invocation time (900), all remaining portlets are to be sorted in further groups of portlets without exceeding the maximum invocation time and are to be invoked parallel to each other however all portlets within one group of portlets are to be invoked sequentially to each other. Each group of portlets requires its own thread. That implementation can be used when for each group an own threads is available (1000).

The portlets are to be invoked (partially) parallel return their content in an in deterministic order. To enable the aggregation to access the rendered portlet markup in the correct order this content must be stored in buffers on a per portlet basis (1100). The aggregation component can now aggregate the content of the corresponding buffers in the required order (1200) and send the content in that order to the user (1300).The user's browser then displays the content.

Another embodiment of the present invention may be implemented as follows:

While in the first embodiment of the present invention as described above the invocation of portlets is based on portal page basis that means that the maximum invocation time for displaying a page is specified and all decisions to invoke parallel or sequentially are based on that maximum invocation time criteria, the available threads and the estimated portlet invocation time. In the following embodiment the maximum invocation time for displaying a page is replaced by a portal-wide portlet invocation time mark, which is preferably defined by an administrator. The estimated portlet invocation time of each portlet to be invoked is compared with portlet invocation time mark. If that portlets take presumably a longer time than given by the portlet invocation time mark (time mark for rendering content), then the portlets will be invoked parallel if the number of working threads is smaller than the given thread pool mark. This decision will be made for each portlet to be invoked. The above-mentioned embodiment will be explained by means of following scenario.

The portlet invocation time mark has been specified by 2 seconds. 5 portlets have to be invoked to display a page. The estimated response time for those portlets are as follows: P1–1 sec, P2=2 sec, P3=3 sec, P4=4 sec, P5=5 sec.

P 3, 4, 5 are greater than the portlet invocation time mark. If the number of working threads is greater than the thread pool workload mark then the portlets 3-5 are to invoke sequentially. However, if number of working threads is lower than the thread pool workload mark then the portlets 3-5 are to be invoked parallel. It may also be possible that the thread pool becomes empty when all threads are running. In that case there is a mechanism, which secures that the portlets are to be invoked sequentially.

FIGS. 10 A/B shows a preferred embodiment of the thread pool implementation as used by the present invention.

Figure 10A:
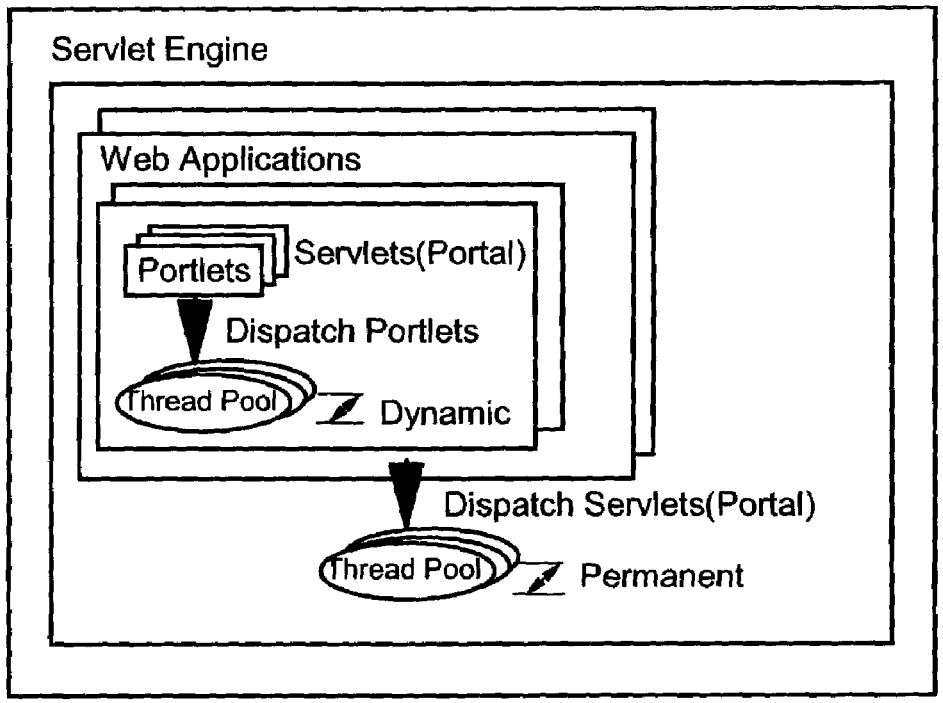

The Portal runs as an application in the Application Server (AS), which is preferably an Application Server—Java Virtual Machine (AS-JVM) (FIG. 10A). The AS-JVM provides a thread pool to handle incoming user requests in parallel. The AS—thread pool determines the number of user requests, which can be processed in parallel. When the number of requests (e.g. HTTP-requests) exceeds a certain given number all incoming requests are to be processed in a sequential order.

Figure 10B:
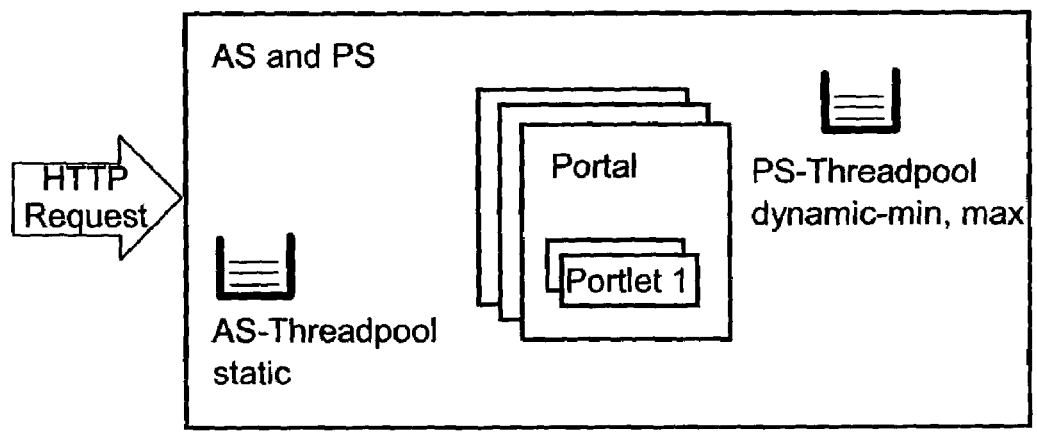

For enabling parallel invocation of portlets the Portal Server needs its own thread pool for maintenance of the working threads (FIG. 10B). The thread pool of the Portal Server starts with a maximum number of threads within the thread pool. The number of working threads will be steadily compared with the maximum number of threads within the thread pool. When the number of working threads exceeds the maximum number of threads, then all further invocation requests are to be processed in sequential order. To prevent that the thread pool will become empty by using too many threads for parallel invocation the maximum number of threads within the thread pool should be reduced by a defined number of threads (maximum number of threads within the thread pool–defined number threads =available threads). This may be done by the administrator personally based on his experience about system utilization. Another method could be that the number of available threads will be permanently determined by the management of the thread pool having access to different system parameters, e.g. memory, performance of the processor.

In-depth tests of various scenarios with various algorithms have shown that the performance of the portlet aggregation could be significantly enhanced by using partially parallel invocation.

Even despite including the test of inappropriate configurations for given scenarios (worst case tests) an average performance increase of about 40% could be observed.

The invention claimed is:

1. An adaptive control system in a portal system embodied on a computer readable physical media, wherein said portal comprises an authentication component for use authentication, a customization component for user configuration, an authorization component for providing user access to authorized content, portlets for rendering content, an aggregation component for aggregation of content provided by said portlets, wherein said adaptive control system is configured to perform the inventive method which comprises the steps of:

receiving portlet invocation requests;

accessing a time mark for rendering content to be displayed, and estimated portlet invocation times for said requested portlets;

determining and invoking a group of maximal number of portlets to be invoked sequentially without exceeding said time mark; and invoking all remaining portlets parallel to said first group.

2. Method performed by said adaptive control system according to claim 1 further comprising the steps of:

accessing a thread pool workload mark and number of working threads and calculating the available threads; and invoking said remaining portlets parallel to each other depending on a comparison between number of working threads and threat pool workload mark.

3. Method performed by said adaptive control system according to claim 1, wherein said portlet content may be stored locally or remotely.

4. Method performed by said adaptive control system according to claim 1, wherein said thread pool workload mark may be specified by the administrator or may be dynamically generated based on the current system utilization.

5. Method performed by said adaptive control system according to claim 1, wherein said available threads are calculated by thread pool workload mark minus working threads.

6. Method performed by said adaptive control system according to claim 1, wherein said estimated portlet invocation time is calculated with the formula $t_{estimated\ n+1} = (1-a) t_{n-1} + a\, t_n$, where a is a constant which indicates how strong the time adapts to the time of the latest invocation, and $t_{n-1}$ is the value given in the portlet configuration which will be adapted after each invocation of that portlet.

7. Method performed by said adaptive control system according to claim 1, wherein said time mark for rending content to be displayed is a portal-wide portlet rendering time mark which may be specified by the administrator.

8. Method performed by said adaptive control system according to claim 7, wherein said determining and invoking step is performed on portlet by portlet basis.

9. Method performed by said adaptive control system according to claim 8, wherein all portlets which estimated invocation time exceed the portal-wide portlet rendering time will be performed parallel if enough threads are available.

10. Method performed by said adaptive control system according to claim 1, wherein said time mark for rendering content to be displayed is the maximum invocation time for displaying a portal page which may be configured by an administrator or may be derived from the portlet with the longest estimated invocation time.

11. Method performed by said adaptive control system according to claim 10, wherein said invoking step includes the further step to determine a further group of portlets from said remaining portlets to be invoked sequentially without exceeding said maximum invocation time which is being invoked parallel to said first group, and repeats said determination step as long as said working threats do not exceed said maximum number of threats of the threat pool.

12. Method performed by said adaptive control system according to claim 11, wherein said determination step determines a group of the maximal number of the fastest portlets to be invoked sequentially without exceeding the maximum invocation time, and all remaining portlets are to be invoked parallel to each other as long as the working threats do not exceed the maximum number of threats of the threat pool.

13. Method performed by said adaptive control system according to claim 11, wherein said determination step defines a group of portlets to be invoked sequentially having an estimated portlet invocation time which does not exceed said time mark and all remaining portlets are to be invoked parallel to each other as long the working threats do not exceed the maximum number of threats of the threat pool.

14. Method performed by said adaptive control system according to claim 1, wherein all portlets, which access local content are to be invoked sequentially without using said determination step.

15. An adaptive control system for invocation of portlets via a portal comprising:

a computer readable physical media;

a component for providing access to a time mark for rendering content to be displayed, a thread pool workload mark, and estimated portlet invocation times for said requested portlets, and a component, stored on the computer readable physical media for execution on a processor, for determining and invoking a group of maximal number of portlets to be invoked sequentially without exceeding said time mark, and invoking all remaining portlets parallel to said first group, wherein said decision to invoke said remaining portlets parallel to each other depends on a comparison between number of working threads and maximum number of threads within a thread pool (thread pool work load mark).

16. An adaptive control system according to claim 15, wherein said adaptive control system is part of the portal.

17. An adaptive control system according to claim 15, wherein said portal comprises:

an authentication component for user authentication;

a customization component for user configuration;

an authorization component for providing user access to authorized content; and an aggregation component for aggregation of content provided by said portlets.

18. An adaptive control system according to claim 15, wherein said portal further comprises a portlet container which provides a common interface to said portlets on one side and an interface to said adaptive control system on the other side.

19. An adaptive control system according to claim 15, wherein said portlets provide access to remote Web-Service content by means of a SOAP-communication protocol.

20. A portal comprising:

a computer readable physical media;

an authentication component, stored on the computer readable physical media for execution on a processor, for user authentication;

a customization component, stored on the computer readable physical media for execution on a processor, for user configuration;

an authorization component, stored on the computer readable physical media for execution on a processor, for providing user access to authorized content;

portlets for rending content; and an aggregation component, stored on the computer readable physical media for execution on a processor, for aggregation of content provided by said portlets, characterized by an adaptive control system for invocation of portlets, the aggregation component, comprising:

logic for receiving portlet invocation requests;

logic for accessing a time mark for rending content to be displayed, and estimated portlet invocation times for said requested portlets;

logic for determining and invoking a group of maximal number of portlets to be invoked sequentially without exceeding said time mark; and logic for invoking all remaining portlets parallel to said first group.

21. A computer program product for invoking portlets in conjunction with a portal, comprising:

a computer-readable, physical memory;

logic, stored on the memory for execution on a processor, for receiving a portlet invocation request;

logic, stored on the memory for execution on the processor, for accessing a time mark for rendering content to be displayed, and estimated portlet invocation times for a plurality of portlets corresponding to the portlet invocation request;

logic, stored on the memory for execution on the processor, for determining and invoking a group of maximal number of portlets of the plurality of portlets to be invoked sequentially without exceeding said time mark; and logic, stored on the memory for execution on the processor, for invoking all remaining portlets of the plurality of portlets parallel to said first group.

* * * * *